(12) United States Patent
Fernando et al.

(10) Patent No.: US 11,766,077 B2
(45) Date of Patent: Sep. 26, 2023

(54) GARMENT COMPONENT AND GARMENT COMPRISING THE SAME

(71) Applicant: MAS INNOVATION (PRIVATE) LIMITED, Colombo (LK)

(72) Inventors: Ruwandi Fernando, Colombo (LK); Achala Satharasinghe, Colombo (LK); Danushka Gunasekara, Colombo (LK); Shaima Nizar, Colombo (LK); Supun Premasiri, Colombo (LK); Thilina Kalahe, Colombo (LK)

(73) Assignee: MAS INNOVATION (PRIVATE) LIMITED, Battaramulla (LK)

( * ) Notice: Subject to any disclaimer, the term of this patent is extended or adjusted under 35 U.S.C. 154(b) by 0 days.

(21) Appl. No.: 17/655,076

(22) Filed: Mar. 16, 2022

(65) Prior Publication Data

US 2022/0295926 A1    Sep. 22, 2022

(51) Int. Cl.
*A41D 7/00*    (2006.01)
*B32B 3/02*    (2006.01)
(Continued)

(52) U.S. Cl.
CPC ............... *A41D 7/00* (2013.01); *B32B 3/02* (2013.01); *B32B 5/26* (2013.01); *B32B 27/12* (2013.01);
(Continued)

(58) Field of Classification Search
CPC .......... A41B 9/12; A61F 13/49446; A61F 13/49453; A61F 13/8405; A61F 13/515; A61F 13/537; A61F 13/5616; A61F 13/84; A61F 13/56; A41D 31/10; A41D 31/125; A41D 7/00; A41D 31/12;
(Continued)

(56) References Cited

U.S. PATENT DOCUMENTS 11,330,847 B2    5/2022    Etienne
2021/0030605 A1*    2/2021    Kajanthan ......... A61F 13/49006

FOREIGN PATENT DOCUMENTS

AU    2014218471 B2    10/2016
CN    104041953 A    9/2014
(Continued)

OTHER PUBLICATIONS

International Search Report Issued in Application No. PCT/SG2022/050138, dated Jun. 9, 2022, 4 pages.
(Continued)

*Primary Examiner* — Camie S Thompson
(74) *Attorney, Agent, or Firm* — Osha Bergman Watanabe & Burton LLP (57) ABSTRACT

The present disclosure generally relates to a garment component for use in a garment. The garment component comprises: a liquid impermeable base layer; a liquid impermeable peripheral layer disposed along a periphery of the liquid impermeable base layer; and a space defined by the liquid impermeable base and peripheral layers. When the garment comprising the garment component is worn on a user, the garment forms a sealing engagement between the liquid impermeable peripheral layer and the user's skin, such that the liquid impermeable base and peripheral layers prevent liquid flow into and out of the space and the space collects bodily fluids from the user.

20 Claims, 8 Drawing Sheets

(51) Int. Cl.
    *B32B 5/26*        (2006.01)
    *B32B 27/12*       (2006.01)
(52) U.S. Cl.
    CPC ..... *B32B 2307/726* (2013.01); *B32B 2437/00* (2013.01)
(58) Field of Classification Search
    CPC .... B32B 2307/7265; B32B 2307/7242; B32B 3/02; B32B 5/26; B32B 27/12; B32B 2307/726
    USPC .......................................................... 442/286
    See application file for complete search history.

(56)            References Cited

FOREIGN PATENT DOCUMENTS

CN      205285048 U     6/2016
WO        9636248 A1    11/1996
WO      2015177307 A1   11/2015

OTHER PUBLICATIONS

Written Opinion Issued in Application No. PCT/SG2022/050138, dated Jun. 9, 2022, 6 pages.

* cited by examiner

GARMENT COMPONENT AND GARMENT COMPRISING THE SAME

CROSS REFERENCE TO RELATED APPLICATION(S)

The present disclosure claims the benefit of Singapore Patent Application No. 10202102649Y filed on 16 Mar. 2021, which is incorporated in its entirety by reference herein.

TECHNICAL FIELD

The present disclosure generally relates to a garment component for a garment. More particularly, the present disclosure describes various embodiments of a garment component for use in a garment and a garment comprising the garment component.

BACKGROUND

Garments such as swimwear are designed to be used in an aquatic environment such as a swimming pool. However, people who suffer from irregular periods or urinary incontinence may be hesitant about swimming as bodily fluids like menstrual fluid and urine can unexpectedly leak into the swimming pool. This can make them embarrassed and create unhygienic situations in the swimming pool.

Therefore, in order to address or alleviate at least the aforementioned problem or disadvantage, there is a need to provide a garment comprising a garment component.

SUMMARY

According to a first aspect of the present disclosure, there is a garment component for use in a garment. The garment component comprises: a liquid impermeable base layer; a liquid impermeable peripheral layer disposed along a periphery of the liquid impermeable base layer; and a space defined by the liquid impermeable base and peripheral layers. When the garment comprising the garment component is worn on a user, the garment forms a sealing engagement between the liquid impermeable peripheral layer and the user's skin, such that the liquid impermeable base and peripheral layers prevent liquid flow into and out of the space and the space absorbs bodily fluids from the user.

According to a second aspect of the present disclosure, there is garment comprising a fabric substrate and a garment component. The garment component comprises: a liquid impermeable base layer; a liquid impermeable peripheral layer disposed along a periphery of the liquid impermeable base layer; and a space defined by the liquid impermeable base and peripheral layers. When the garment is worn on a user, the garment forms a sealing engagement between the liquid impermeable peripheral layer and the user's skin, such that the liquid impermeable base and peripheral layers prevent liquid flow into and out of the space and the space absorbs bodily fluids from the user.

A garment component for use in a garment and a garment comprising the garment component according to the present disclosure are thus disclosed herein. Various features, aspects, and advantages of the present disclosure will become more apparent from the following detailed description of the embodiments of the present disclosure, by way of non-limiting examples only, along with the accompanying drawings.

DETAILED DESCRIPTION

For purposes of brevity and clarity, descriptions of embodiments of the present disclosure are directed to a garment component for use in a garment and a garment comprising the garment component, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, known systems, methods, procedures, and components have not been described in detail so as to not unnecessarily obscure aspects of the embodiments of the present disclosure.

In embodiments of the present disclosure, depiction of a given element or consideration or use of a particular element number in a particular figure or a reference thereto in corresponding descriptive material can encompass the same, an equivalent, or an analogous element or element number identified in another figure or descriptive material associated therewith.

References to "an embodiment/example", "another embodiment/example", "some embodiments/examples", "some other embodiments/examples", and so on, indicate that the embodiment(s)/example(s) so described may include a particular feature, structure, characteristic, property, element, or limitation, but that not every embodiment/example necessarily includes that particular feature, structure, characteristic, property, element, or limitation. Furthermore, repeated use of the phrase "in an embodiment/example" or "in another embodiment/example" does not necessarily refer to the same embodiment/example.

The terms "comprising", "including", "having", and the like do not exclude the presence of other features/elements/steps than those listed in an embodiment. Recitation of certain features/elements/steps in mutually different embodiments does not indicate that a combination of these features/elements/steps cannot be used in an embodiment. The terms "a" and "an" are defined as one or more than one.

The use of "/" in a figure or associated text is understood to mean "and/or" unless otherwise indicated. The recitation of a particular numerical value or value range herein is understood to include or be a recitation of an approximate numerical value or value range.

Figure 1A:
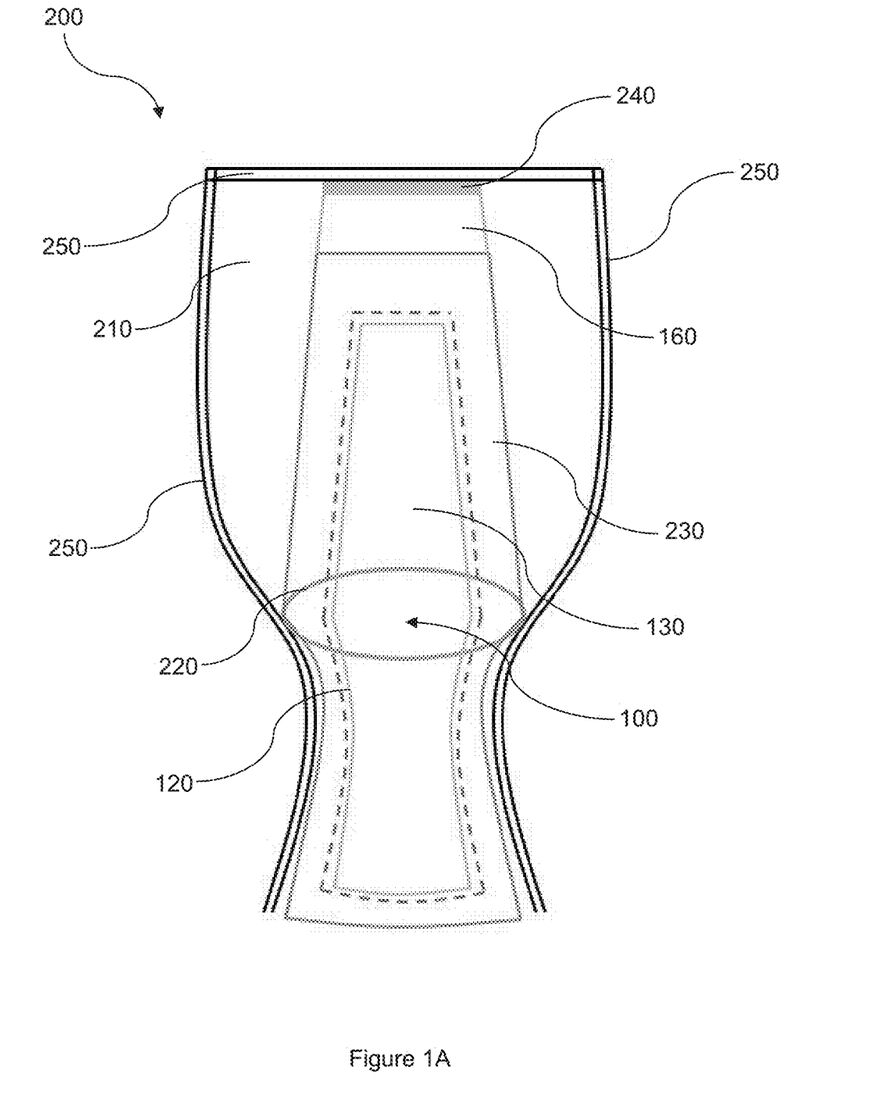
FIG. 1A is an illustration of a garment comprising a garment component.
Figure 1B:
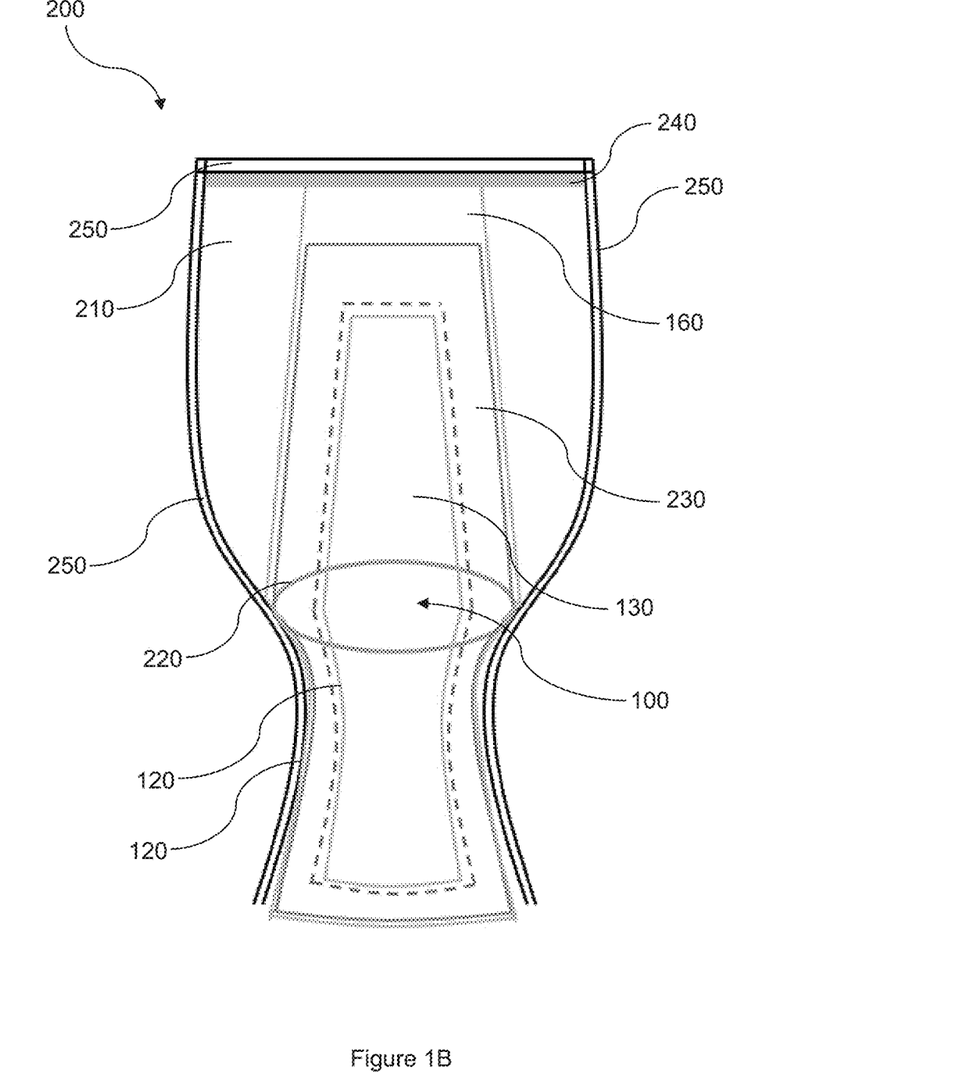
FIG. 1B is another illustration of the garment comprising the garment component.

In representative or exemplary embodiments of the present disclosure, there is a garment component 100 for use in a garment 200 as illustrated in FIGS. 1A and 1B. The garment 200 includes a fabric substrate 210 and the garment component 100 that is attached to or integrally formed with the fabric substrate 210. The garment 200 may be a swimwear or sports undergarment that has at least one area that is worn over a part of the user's body where there may be excretion of bodily fluids. For example, the garment 200 is a swimwear or undergarment or nursing garment worn on the lower torso of a male or female user. FIGS. 1A and 1B show the inner back panel of the garment 200. The garment 200 includes a gusset area 220 that is worn over the groin part of the user's body where there may be excretion of bodily fluids such as like urine, menstrual fluid, and vaginal discharge. The garment component 100 is disposed at the gusset area 220 to absorb these bodily fluids. Alternatively, the garment 200 may be a swimwear such as a bikini top that is worn over the upper body of a female user. Yet alternatively, the garment 200 may be a diaper such as a swimming diaper that is worn by babies and toddlers.

Figure 2A:
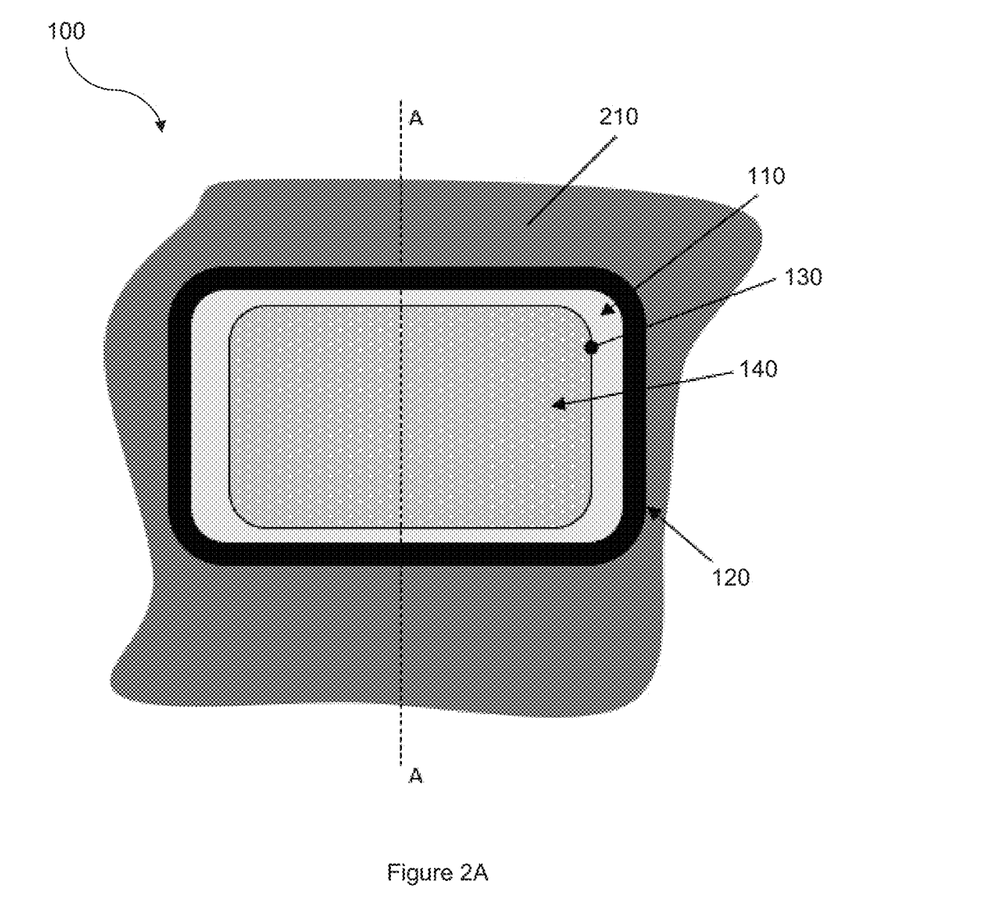
FIG. 2A is an illustration of the garment component.
Figure 2B:
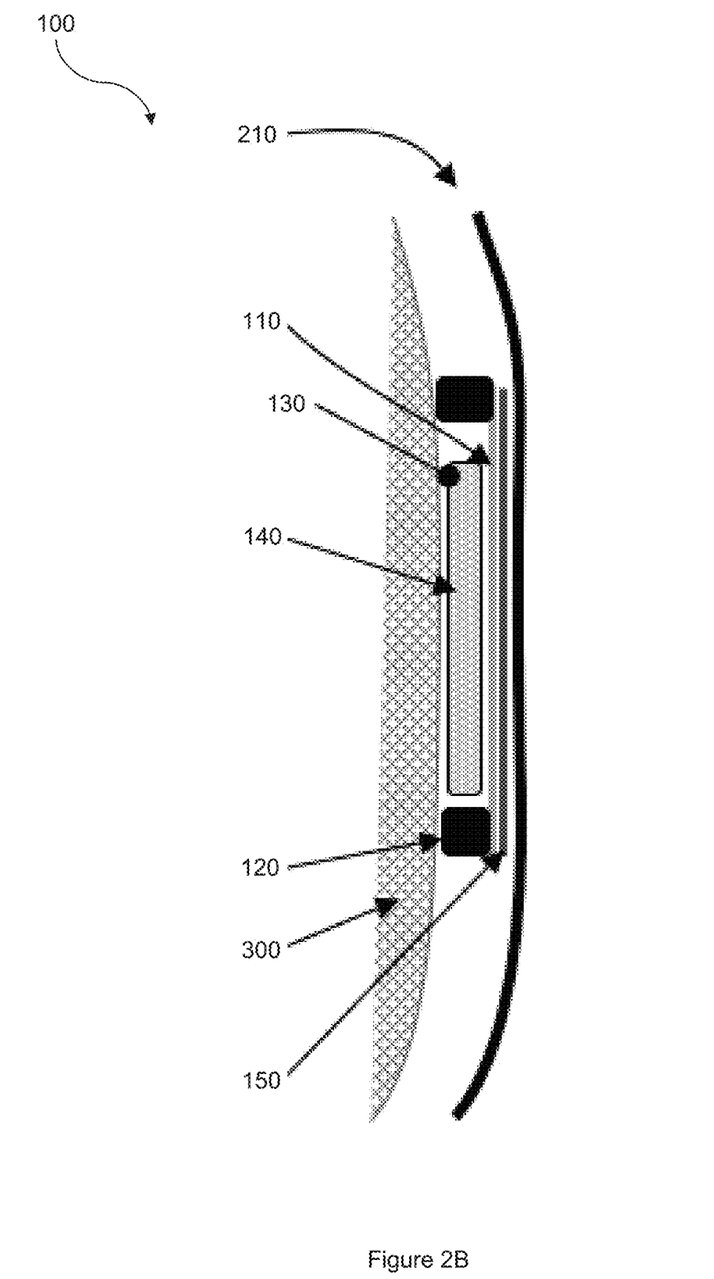
FIG. 2B is a cross-sectional illustration of the garment component along section line A-A in FIG. 2A.

As shown in FIGS. 2A and 2B, the garment component 100 includes a liquid impermeable base layer 110, a liquid impermeable peripheral layer 120 disposed along a periphery of the liquid impermeable base layer 110, and a space 130 defined by the liquid impermeable base and peripheral layers 110, 120. When the garment 200 comprising the garment component 100 is worn on the user, the garment 200 forms a sealing engagement between the liquid impermeable peripheral layer 120 and the user's skin 300, such that the liquid impermeable base and peripheral layers 110, 120 prevent liquid flow into and out of the space 130 and the space 130 collects bodily fluids from the user.

More specifically, when the user is wearing the garment 200 comprising the garment component 100, the garment 200 which is body-hugging and fits closely to the user's body presses the garment component 100 against the user's body. This in turn forms the sealing engagement between the liquid impermeable peripheral layer 120 and the user's skin 300. This sealing engagement isolates the space 130 from the rest of the garment 200 and traps bodily fluids excreted from the user within the space 130.

Figure 3:
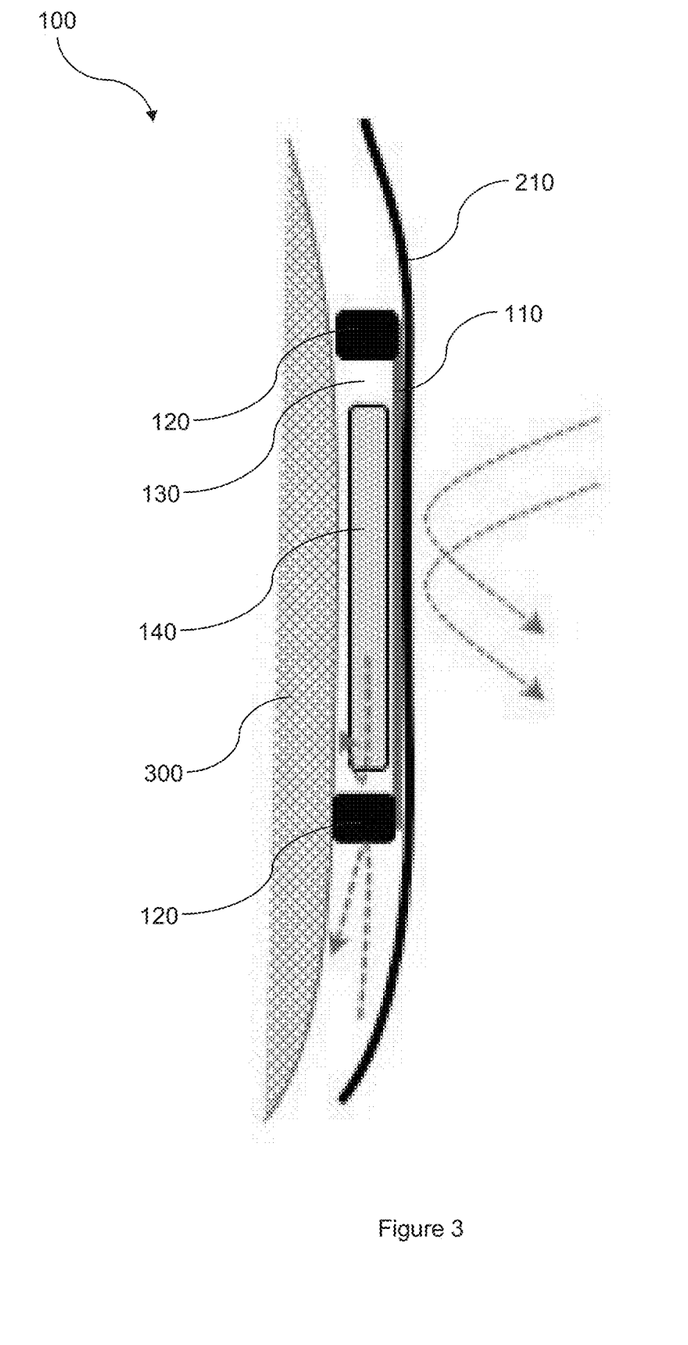
FIG. 3 is another illustration of the garment component preventing liquid inflow and outflow.

Moreover, if the user is swimming while wearing the garment 200, the water pressure from the swimming pool or aquatic environment may further force the garment component 100 against the user's body. This may in turn strengthen the sealing engagement between the liquid impermeable peripheral layer 120 and the user's skin 300. As shown in FIG. 3, the sealing engagement prevents the bodily fluids from leaking out of the space 130 and into the aquatic environment and avoids unhygienic situations, i.e. prevents liquid outflow. Additionally, the sealing engagement prevents water ingress from the aquatic environment from into the space 130, i.e. prevents liquid inflow, which can cause discomfort to the user especially at the more sensitive groin part. The garment component 100 thus advantageously prevents liquid interaction between the internal space 130 and the external aquatic environment.

In some embodiments, the garment component 100 further includes a functional layer 140 disposed in the space 130 and attached to the liquid impermeable base layer 110, the functional layer 140 configured for facilitating collection of the bodily fluids in the space 130. The functional layer 140 may partially or fully occupy the space 130.

In one embodiment, the functional layer 140 is removably attached to the liquid impermeable base layer 110, such as through fasteners like touch fasteners. In one embodiment, the functional layer 140 is permanently attached to or integrally formed with the liquid impermeable base layer 110. For example, the functional layer 140 is bonded to the liquid impermeable base layer 110 via suitable bonding means, such as adhesive or ultrasonic bonding. The adhesive tape may be a double-sided adhesive tape and said tape may have a single layer or multiple layers. The liquid glue may be a hot melt glue, a liquid resin, or combinations thereof (e.g. the adhesive may be a hot melt glue/liquid resin bonding by nozzle extrusion or liquid resin bonding by screen printing/template printing).

The functional layer 140 may include at least one liquid absorbent element for absorbing the bodily fluids. The liquid absorbent element may include any liquid absorbent/absorbing material known in the art (e.g. cotton, a cotton blend, foam, a synthetic material, absorbent polymeric foam, a nanotechnology-based or -produced material, or any other moisture-absorbent material). Other suitable materials for the liquid absorbent element include polypropylene or any cellulose-based fabric and their blends including cotton, bamboo, etc. Fabric materials used for the liquid absorbent element may be knitted, woven, or non-woven.

In one embodiment, the liquid absorbent element is made from an 80:20 blend of polyester: nylon fabric with a microfiber double terry knit. In one embodiment, the liquid absorbent element is made from a 100% polyester double terry fabric. This material is approximately 90% air and so allows for a higher absorbent capacity, as moisture fills up the air gaps of the polyester terry fabric without significant expansion of the polyester fibres. This does not translate into significantly thicker functional layer 140. In one embodiment, the liquid absorbent element is made from a blended fibre comprising two or more of superabsorbent polymer (SAP), hydrogel and polyester, or at least part of the liquid absorbent element may have been treated with SAP and/or hydrogel. The use of these materials may result in increased liquid absorbent capacity, with a reduced thickness and weight for the functional layer 140.

The functional layer 140 may include at least one wicking element for wicking the bodily fluids away from the user. The wicking element is capable of acquiring and/or distributing liquid or moisture away from the user's body into the space 130. For example, the wicking element distributes the bodily fluids such that they are evenly distributed along the plane of the space 130. In some embodiments, the functional layer 140 include the liquid absorbent element and the wicking element. When the garment 200 is worn on the user, the wicking element faces the user's body and serves to transport the bodily fluids produced by the user's body away from the user into the underlying liquid absorbent element. In other words, the wicking element transports liquid from its surface that is in direct contact with the user to its internal surface that is in contact with the liquid absorbent element. Wicking the bodily fluids away from the user's body provides an improved dry feel on the surface of the wicking element in contact with the user's skin 300. This helps the user to be fresh without having a damped feel between the functional layer 140 and the user's body to maintain the microclimate in a dry state.

The wicking element may be made from fibres or yarns made with fibres, where said fibres and yarns are selected from one or more of the group consisting of polyamide, polyester, polyolefin, polyurethane, polyacrylonitrile, natural cellulose, regenerated cellulose, regenerated cellulose derivatives (i.e. cellulose acetate and cellulose triacetates), natural protein and regenerated protein. The wicking element may be produced using technologies such as knitting (warp knitting such as raschel Tricot, weft knitting such as circular or flat), weaving, non-woven methods (blow spinning, staple nonwoven, spun laid, air-laid, needle punched, thermal bonded, hydro-entangled, chemical bonded and so forth), electro-spinning, force-spinning etc. Additionally, the wicking element may also include one or more of the coatings, treatments encapsulation or entrapments, which would enhance its liquid and moisture management functionality, such as rate of wicking, wicking capacity, rate of spreading and distribution, one-way liquid transport etc.

The material of the wicking element may be naturally moisture-wicking and/or be treated to become moisture-wicking. For example, the wicking material may be 100% polyester fabric with French Terry knit and a denier differential across the two faces of the wicking element that assists in moving the liquid from the skin-facing side of the wicking element to the internal surface that is in contact with the liquid absorbent element. Other suitable wicking materials include blends of polyester, polypropylene, and cotton. An advantage associated with the use of a wicking element having the triangular ridge structures of French Terry knitting facing the user's skin 300 is that less surface area of the surface of the wicking element comes into contact with the skin 300 and therefore reduces any sensation of feeling wetness against the skin 300.

In one embodiment, the wicking element is made from a material that is 51% cotton and the inner and/or outer surfaces of the wicking element may be treated with a hydrophilic composition or material (e.g. polyethylene oxide, polyvinyl alcohol, polyacrylamide, poly acrylic acid, polyvinyl pyrrolidone, hydrophilic silicones, or hydrophilic polyurethanes) and/or a hydrophobic composition or material (e.g. silicones, polyfluoroalkylacrylates, polyacrylates, polyurethanes, or waxes) to create a net hydrophilic gradient across the wicking element. In other words, the surface in direct contact with the user's skin 300 may be less hydrophilic (i.e. more hydrophobic) whereas the inner surface may be more hydrophilic. For example, the outer surface of the wicking element in direct contact with the user's skin 300 may be treated with a hydrophobic material and/or the opposing inner surface may be treated with a hydrophilic material. This results in a combination of a "pushing" force generated by the hydrophobic properties of the outer surface in direct contact with the user's skin 300 and a "pulling" force generated by the hydrophilic properties of the inner surface that may wick any moisture or liquid through the wicking element and away from the user. The hydrophilic and hydrophobic compositions may be applied to the wicking element using any conventional method known to the skilled person.

Additionally, the differential capillary forces on either side can be created by the fabric structure of the wicking element where one side of the wicking element has a smaller pore size in comparison to the opposite side of the wicking element. Ideally, this pore combination creates funnel-like structures through the wicking element in cross-section, where the liquid is pulled from the side with the larger pore size to the side with the smaller pore size, due to the differential capillary pressure.

The rate of wicking through the wicking element may be controlled to be faster or slower. The rate may be set at a maximum rate of absorption of the wicking element to ensure that all, or a significant percentage of, the liquid is absorbed by the liquid absorbent element and does not leak beyond the confines of the space 130. The rate of wicking may be controlled by the density, thickness, or composition of the wicking element and/or by the amount and type of hydrophobic and/or hydrophilic material applied to the wicking element. In another embodiment, the rate of wicking may be set such that the surface of the wicking element in direct contact with the user feels dry or mostly dry to the user while the other surface may feel wet.

The functional layer 140 may include at least one of the liquid absorbent element and/or at least one of the wicking element. Further, the functional layer 140 may include multiple liquid absorbent elements and/or multiple wicking elements to improve the liquid absorption capacity of the space 130.

The functional layer 140 may optionally include one or more of an antimicrobial agent, an odour-combatting agent, and a stain-resistant agent. For example, the antimicrobial agent may include one or more substances selected from the group consisting of a silver-containing substance, titanium dioxide, a quaternary silane, hydrogen peroxide, triclosan, and zinc pyrithione. The functional layer 140 may optionally include an agent or substance that combats odour. For example, the odour-combatting agent may include one or more substances selected from the group consisting of nanoparticles with acid-neutralising pockets, high surface area mineral compositions, high surface area ceramic compositions and high surface area clay compositions.

The liquid impermeable base layer 110 prevents liquid communication from the space 130 therethrough, such as to an external aquatic environment, and prevents liquid communication from the external aquatic environment through the liquid impermeable base layer 110 into the space 130. The liquid impermeable base layer 110 is leak-proof and may include any known wholly or partially liquid-blocking material. Preferably, the liquid impermeable base layer 110 is breathable, so that liquid may not pass through it, but gases (including air and water vapour) can do so. For example, the liquid impermeable base layer 110 may include a polymer film, such as one or more layers of a thermoplastic or thermoset film, where the thermoplastic or thermoset film is selected from one or more of the group consisting of polyurethane, polyester, polyolefin, and silicone. Particular examples of liquid impermeable materials include layers made from a liquid impermeable polymer or a thermoplastic polyurethane film.

In one embodiment, the liquid impermeable base layer 110 is a liquid-proof membrane. In one embodiment, the liquid impermeable base layer 110 is a lightweight tightly knitted/woven fabric coated with SAP/hydrogel, or a lightweight tightly knitted/woven fabric made using textile/SAP hybrid fibres. When used in the garment 200 comprising the garment component 100, the liquid impermeable base layer 110 may provide the advantage of being fully breathable in dry form, while providing an effective barrier material upon exposure to liquid. Furthermore, these materials may also enable the garment component 100 to dry more quickly than the use of a liquid impermeable polymer such as a thermoplastic polyurethane film.

The garment 200 comprises the fabric substrate 210 and the garment component 100, such as at the gusset area 220, to absorb bodily fluids from the user. The fabric substrate 210 may contain one or more layers. For example, when the fabric substrate 210 contains two layers, there is an inner fabric layer that wholly or partially contacts the user's body and an outer fabric layer that is not in contact with the user's body. The outer fabric layer may be one or more of various colours, patterns, or designs (e.g., black, white, pink, etc.) to provide choices to the user, though for a fabric substrate 210 containing a single layer a dark colour may be preferred. When the fabric substrate 210 comprises more than one layer, the inner fabric layer may be a dark colour (e.g. black or dark grey) to help provide stain resistance, so that any stain thereon is invisible or reduced in visibility or noticeability to the user. If the fabric substrate 210 contains two or more layers, all, some, or none of the inner layer or layers may be visible to the user or other observer when the garment 200 worn.

The fabric substrate 210 can be made of any material that is suitable for clothing and particularly swimwear. Preferably, the fabric substrate 210 is made of materials that support the tight fitting of the garment 200 on the user's body so that the garment component 100 can be pressed tightly against the user's body to create the sealing engagement between the liquid impermeable peripheral layer 120 and the user's skin 300.

When the fabric substrate 210 has a single fabric layer, the material may be made of cotton, a cotton blend, a synthetic material, an elasticized blend (e.g. SPANDEX) or any other material (e.g. natural or man-made textile). When the fabric substrate 210 has two or more layers, the inner layer(s) may be made of a thin fabric material, while the outer fabric layer may be made of a thicker fabric material, such as those described above. The inner fabric layer(s) may be cut to the full shape of the fabric substrate 210 or be cut to less than the full shape of the fabric substrate 210. For example, if the garment 200 is a pair of swimming bottoms, an inner fabric layer may be cut to extend to cover only the groin part.

In one embodiment as shown in FIG. 2B, the garment component 100 further includes an attachment layer 150 attached to the liquid impermeable base layer 110 opposite to the space 130, the attachment layer 150 for removably attaching the garment component 100 to the garment 200. For example, the attachment layer 150 includes fasteners such as touch fasteners for removably attaching to the inner surface of the fabric substrate 210.

In one embodiment as shown in FIG. 3, the liquid impermeable base layer 110 is permanently attached to or integrally formed with the fabric substrate 210. For example, the liquid impermeable base layer 110 is bonded to the inner surface of the fabric substrate 210 via suitable bonding means, such as adhesive or ultrasonic bonding described above. The fabric substrate 210 or at least a portion thereof, may be waterproof. For example, the waterproof area of the fabric substrate 210 may be disposed at or around the gusset area 220, such as at an extended gusset area 230.

The liquid impermeable peripheral layer 120 is disposed along the periphery of the liquid impermeable base layer 110. In one embodiment, the liquid impermeable base layer 110 and the liquid impermeable peripheral layer 120 are integrally formed as a single body. In one embodiment, the liquid impermeable peripheral layer 120 is separately formed from and attached to the liquid impermeable base layer 110. For example, the liquid impermeable peripheral layer 120 is removably attached to the liquid impermeable base layer 110, such as through fasteners like touch fasteners. In one embodiment, the liquid impermeable peripheral layer 120 is permanently attached to the liquid impermeable base layer 110, such as via suitable bonding means like adhesive or ultrasonic bonding described above.

In some embodiments, the garment component 100 is disposed at the gusset area 220 of the garment 200, and the liquid impermeable peripheral layer 120 may be aligned to the openings of the garment 200, such as the pair of leg openings defining the gusset area 220. Optionally, the garment 200 may include a second liquid impermeable peripheral layer 240 cooperative with the garment component 100 to prevent liquid flow into and out of the space 130. The second liquid impermeable peripheral layer 240 may be disposed at the end of the extended gusset area 230 or near the waist opening of the garment 200. The second liquid impermeable peripheral layer 240 provides additional sealing engagement to prevent liquid communication to and from the space 130. For example, the second liquid impermeable peripheral layer 240 includes one or more lines of liquid impermeable material (such as silicone) extending partially (such as shown in FIG. 1A) or wholly (such as shown in FIG. 1B) across the waist opening.

Further, the waist opening and leg openings of the garment 200 may include support lining 250 to improve the grip of the garment 200 on the user's body. The support lining 250 may be made of nanoyarns, such as ultrafine polyester, that increase its surface area and frictional resistance.

The liquid impermeable peripheral layer 120 may include one or more continuous lines that surround the space 130. For example as shown in FIG. 1A, the liquid impermeable peripheral layer 120 includes a single line around the space 130. For example as shown in FIG. 1B, the liquid impermeable peripheral layer 120 includes two or more lines around the space 130, wherein the two or more lines may be parallel or concentric to each other. Each line may have a thickness ranging from 1 mm to 10 mm, and preferably from 4 mm to 6 mm. The liquid impermeable peripheral layer 120 can be made of any solid or semi-solid materials that have liquid impermeable and hydrophobic properties. Further, the liquid impermeable peripheral layer 120 can be made of an elastomeric material, such as silicone and rubber (synthetic or natural), to facilitate forming of the sealing engagement with the user's skin 300 when the garment 200 presses the garment component 100 against the user's body.

As the liquid impermeable peripheral layer 120 would be in contact with the user's skin 300, the liquid impermeable peripheral layer 120 should be made of a material with anti-slip properties to prevent the garment component 100 slipping away from the groin part which could risk leakage of bodily fluids out of the garment component 100. Preferably, the liquid impermeable peripheral layer 120 has anti-slip properties in both dry and wet states as the garment 200 may be worn for swimming. For example, the liquid impermeable peripheral layer 120 has greater frictional resistance than polyester or silicone with respect to human skin, such as at least 40% greater. For example, the frictional resistance of the liquid impermeable peripheral layer 120 on skin is at least 40%, preferably 40% to 50%, more than the frictional resistance of polyester on skin in both dry and wet states. More preferably, the frictional resistance of the liquid impermeable peripheral layer 120 on skin is about 67% and 63% more than the frictional resistance of polyester on skin in the dry and wet states, respectively.

It will be appreciated that the above-described features of the liquid impermeable peripheral layer 120 may apply equally to the second liquid impermeable peripheral layer 240.

Figure 4:
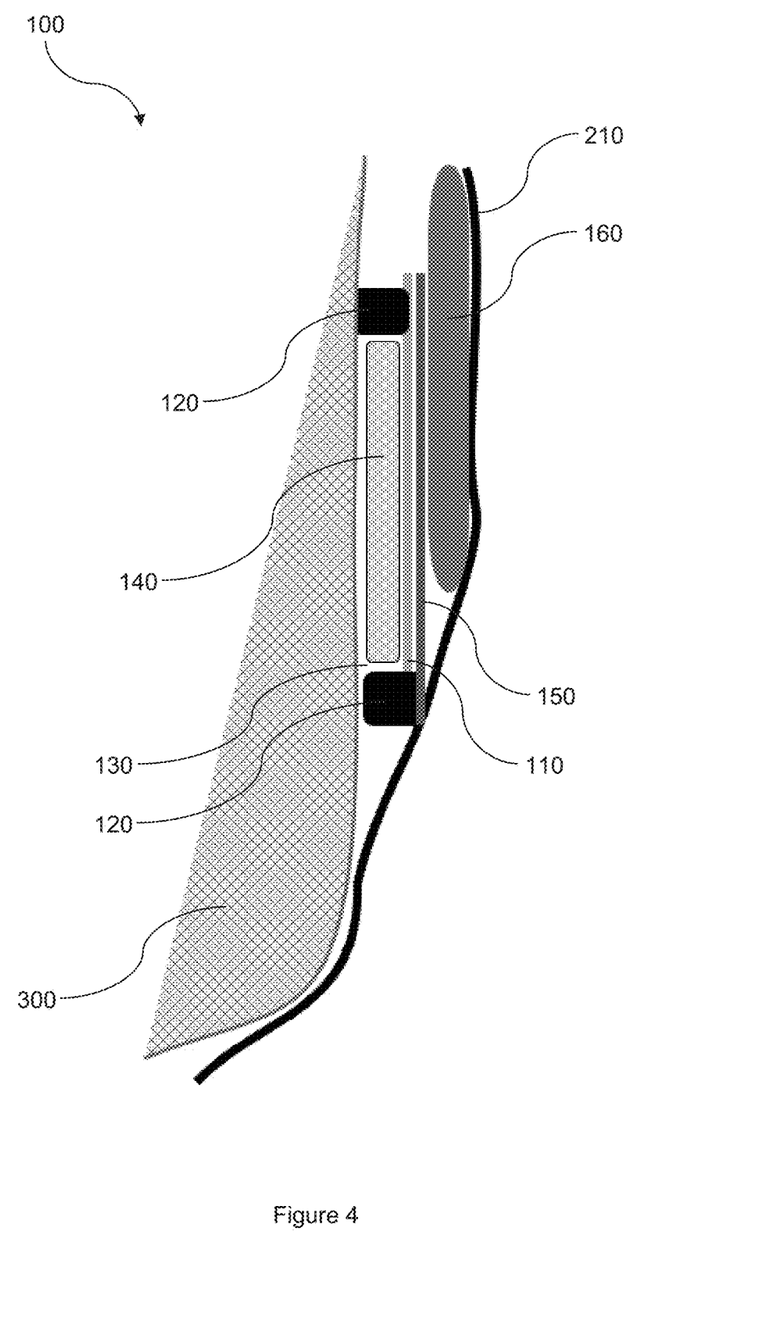
FIG. 4 is another illustration of the garment component with a compressible substrate of the garment.

In some embodiments further as shown in FIG. 4, the garment component 100 includes a compressible layer 160 attached to the liquid impermeable base layer 110 opposite to the space 130. The compressible layer 160 helps to conform the garment component 100 to the shape of the user's body. The compressible layer 160 can be made of any compressible materials with low compression modulus and high compression recovery. For example, the compressible layer 160 can be made of, but should not be limited to, a compressible polyurethane foam, a compressible fabric material, or a compressible gel material.

When the garment 200 comprising the fabric substrate 210 and the garment component 100 is worn, the compressible layer 160 is disposed between the fabric substrate 210 and the liquid impermeable base layer 110 of the garment component 100, and the compressible layer 160 compresses and conforms to the shape of the user's body. For example, the compressible layer 160 is disposed at the extended gusset area 230 so that it can conform the garment component 100 to the contours of the groin part. As the compressible layer 160 is compressed, it exerts an inward force towards the user's body and this inward force conforms the garment component 100 to the shape of the user's body, specifically the body site where the garment component 100 is positioned, such as the groin part. Additionally, the inward force from the compressible layer 160 strengthens the sealing engagement between the liquid impermeable peripheral layer 120 and the user's skin 300. The compressible layer 160 is advantageous in parts of the user's body where the fabric substrate 210 does not make full or firm contact with the body, which could result in poor sealing engagement and consequently leakage of bodily fluids as well as liquid ingress such as from an external aquatic environment. The compressible layer 160 allows a robust sealing engagement to be formed between the garment component 100 and the user's skin 300 regardless of the body site, which can include the groin part as well as other contoured parts like the lower lumbar region. For example, when the garment 200 is worn, the extended gusset area 230 is positioned near the lower lumbar region with contoured and curved surfaces and the compressible layer 160 helps to form a robust sealing engagement at these body sites.

In one embodiment as shown in FIG. 4, the garment component 100 includes the attachment layer 150 for removably attaching the garment component 100 to the fabric substrate 210 of the garment 200. The attachment layer 150 attaches the liquid impermeable base layer 110 and compressible layer 160 to the fabric substrate 210. In one embodiment, the compressible layer 160 is removably attached to the liquid impermeable base layer 110. In one embodiment, the liquid impermeable base layer 110 is permanently attached to or integrally formed with the compressible layer 160, such as by suitable bonding means described above.

As described in various embodiments herein, the garment component 100 is able to collect bodily fluids from the user in the space 130. The sealing engagement between the liquid impermeable peripheral layer 120 and the user's skin 300 prevents leakage of the bodily fluids out of the space 130 and also prevents water ingress from an external environment, such as from the swimming pool if the user wears the garment 200 for swimming.

Figure 5A:
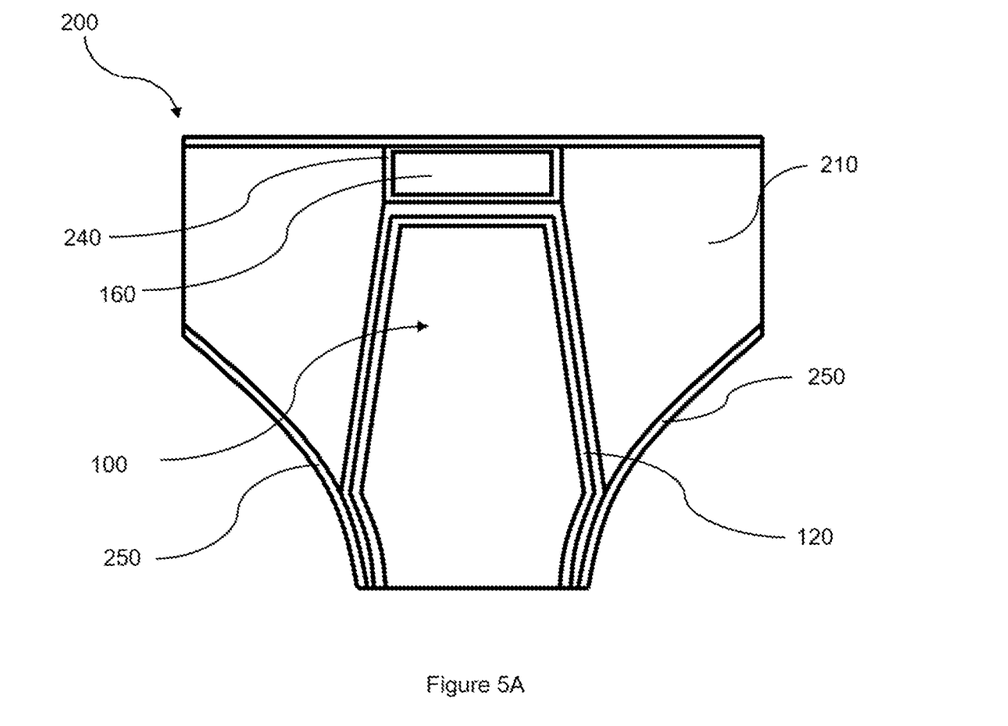
FIGS. 5A to 5D are further illustrations of the garment comprising the garment component and compressible substrate.
Figure 5B:
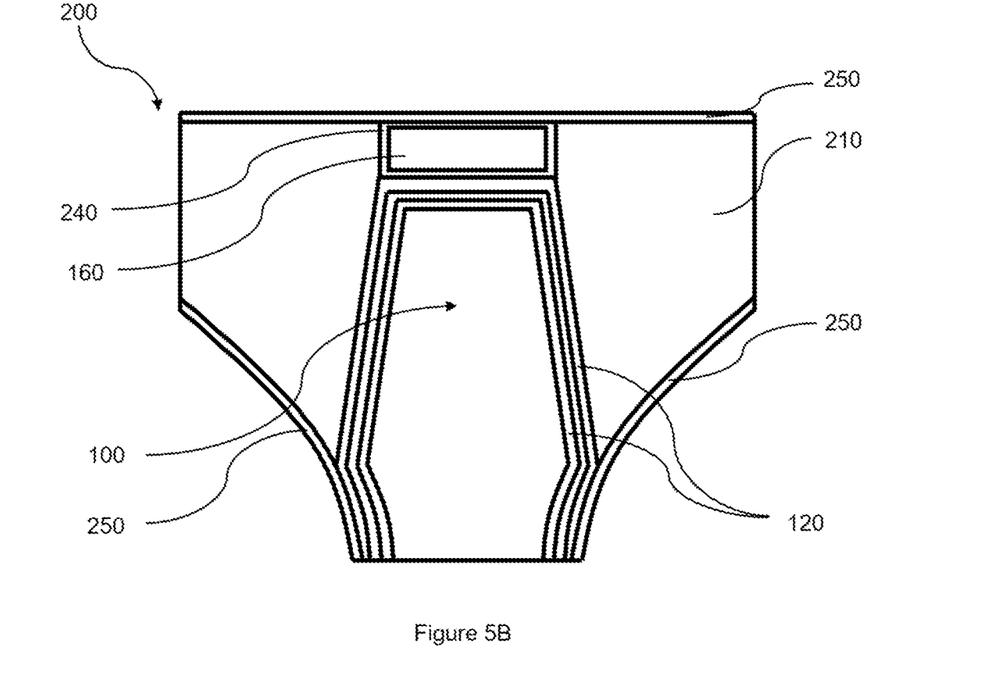
Figure 5C:
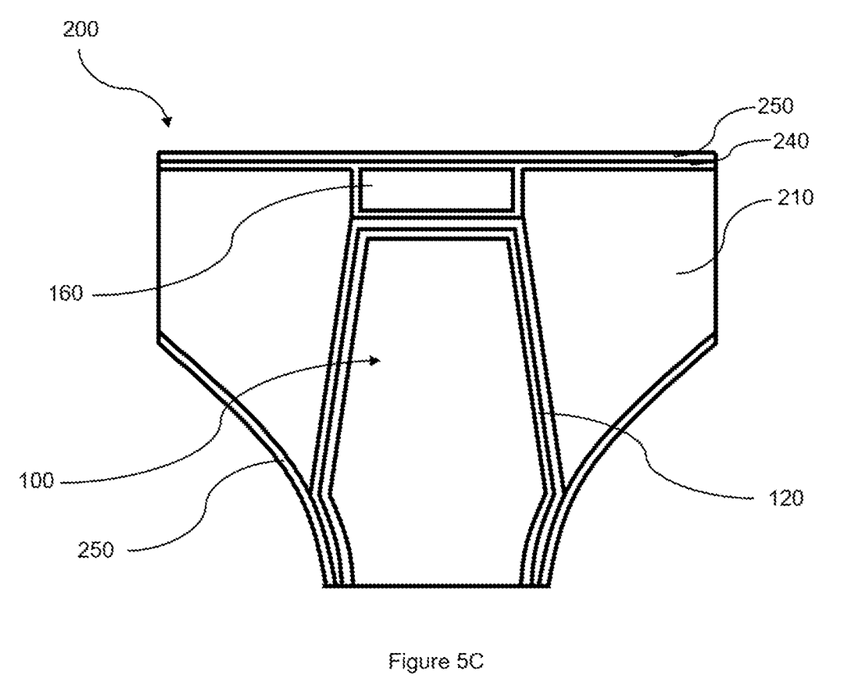
Figure 5D:
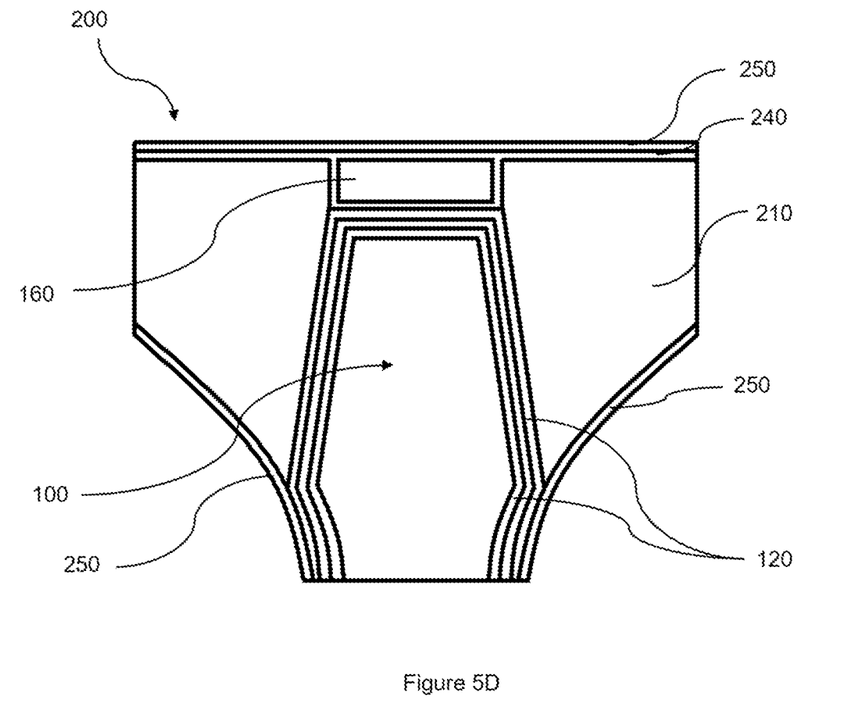

Various examples of the garment 200 are shown in FIGS. 5A to 5D. In FIG. 5A, the garment 200 includes the fabric substrate 210 and the second liquid impermeable peripheral layer 240 extending partially across the waist opening. The garment component 100 at the gusset area 220 includes the liquid impermeable peripheral layer 120 in a single line and the compressible layer 160 at the extended gusset area 230. In FIG. 5B, the garment 200 includes the fabric substrate 210 and the second liquid impermeable peripheral layer 240 extending partially across the waist opening. The garment component 100 at the gusset area 220 includes the liquid impermeable peripheral layer 120 in double lines and the compressible layer 160 at the extended gusset area 230. In FIG. 5C, the garment 200 includes the fabric substrate 210 and the second liquid impermeable peripheral layer 240 extending wholly across the waist opening. The garment component 100 at the gusset area 220 includes the liquid impermeable peripheral layer 120 in a single line and the compressible layer 160 at the extended gusset area 230. In FIG. 5D, the garment 200 includes the fabric substrate 210 and the second liquid impermeable peripheral layer 240 extending wholly across the waist opening. The garment component 100 at the gusset area 220 includes the liquid impermeable peripheral layer 120 in double lines and the compressible layer 160 at the extended gusset area 230.

The garment 200, as well as the garment component 100 if it is removable, should be made washable and reusable to wash off the trapped bodily fluids and also help to reduce environment impact. For example, the garment component 100 and/or the garment 200 is able to withstand multiple machine wash and dry cycles (such as at least 30) without change in overall appearance, integrity of the various layers, and liquid management parameters as described herein. The material selection and unique construction ensures that the garment component 100 and/or the garment 200 are washable without compromising on one or more of moisture management, antimicrobial functionality, and anti-odour functionality, and to ensure that the garment component 100 will not leak during the lifetime of the garment 200. For example, the various materials of the garment component 100 should remain chemically, thermally and mechanically stable throughout the intended lifetime of the garment component 100/garment 200 while undergoing up to the stated wash and dry cycles. Further, the materials should be heat stable up to 190° C, or at least up to 95° C. The adhesive or ultrasonic bonding may be heat stable up to 190° C or 95° C, which enables the garment component 100 to be used in the garment 200 that can be washed and dried multiple times. Unless otherwise specified, used herein, the term "heat stable" is intended to stipulate that there is no change in the physical state of the component in question after being subjected to the stated temperature for a period of time consistent with a machine drying cycle.

In the foregoing detailed description, embodiments of the present disclosure in relation to a garment component for use in a garment and a garment comprising the garment component are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:
1. A garment component for use in a garment, the garment component comprising:
  a liquid impermeable base layer;
  a liquid impermeable peripheral layer disposed on the liquid impermeable base layer; and a space defined by the liquid impermeable base layer and the liquid impermeable peripheral layer, the liquid impermeable peripheral layer disposed around the space, wherein when the garment comprising the garment component is worn on a user, the garment forms a sealing engagement between the liquid impermeable peripheral layer and the user's skin, such that the liquid impermeable base layer and the liquid impermeable peripheral layer prevent liquid flow into and out of the space and the space collects bodily fluids from the user, and wherein the liquid impermeable peripheral layer comprises an elastomeric material that is compressible against the user's skin to form the sealing engagement.

2. The garment component according to claim 1, further comprising a functional layer disposed in the space and optionally removably attached to the liquid impermeable base layer, the functional layer configured for facilitating collection of the bodily fluids in the space.

3. The garment component according to claim 2, wherein the functional layer comprises at least one liquid absorbent element for absorbing the bodily fluids.

4. The garment component according to claim 2, wherein the functional layer comprises at least one wicking element for wicking the bodily fluids away from the user.

5. The garment component according to claim 1, further comprising an attachment layer attached to the liquid impermeable base layer opposite to the space, such that the attachment layer and the space are at opposite sides of the liquid impermeable base layer, the attachment layer for removably attaching the garment component to the garment.

6. The garment component according to claim 1, wherein the liquid impermeable base layer comprises a polymer film.

7. The garment component according to claim 1, wherein the elastomeric material of the liquid impermeable peripheral layer comprises silicone.

8. The garment component according to claim 1, wherein the liquid impermeable peripheral layer has greater frictional resistance than polyester with respect to human skin.

9. The garment component according to claim 1, wherein the liquid impermeable peripheral layer is removably attached to the liquid impermeable base layer.

10. The garment component according to claim 1, further comprising a compressible layer attached to the liquid impermeable base layer opposite to the space, such that the compressible layer and the space are at opposite sides of the liquid impermeable base layer, wherein the compressible layer is for conforming the garment component to a shape of the user's body and the compressible layer is optionally removably attached to the liquid impermeable base layer.

11. A garment comprising:
a fabric substrate; and
a garment component comprising:
a liquid impermeable base layer;
a liquid impermeable peripheral layer disposed on the liquid impermeable base layer; and
a space defined by the liquid impermeable base layer and the liquid impermeable peripheral layer, the liquid impermeable peripheral layer disposed around the space, wherein when the garment is worn on a user, the garment forms a sealing engagement between the liquid impermeable peripheral layer and the user's skin, such that the liquid impermeable base layer and the liquid impermeable peripheral layer prevent liquid flow into and out of the space and the space collects bodily fluids from the user, and wherein the liquid impermeable peripheral layer comprises an elastomeric material that is compressible against the user's skin to form the sealing engagement.

12. The garment according to claim 11, wherein the liquid impermeable peripheral layer is removably attached to the liquid impermeable base layer.

13. The garment according to claim 11,
wherein the garment component further comprises a compressible layer attached to the liquid impermeable base layer opposite to the space, such that the compressible layer and the space are at opposite sides of the liquid impermeable base layer, and
wherein the compressible layer is disposed between the fabric substrate and the liquid impermeable base layer for conforming the garment component to a shape of the user's body.

14. The garment according to claim 13, wherein the compressible layer is removably attached to the liquid impermeable base layer.

15. The garment according to claim 11, wherein the garment component is disposed at a gusset area of the garment.

16. The garment according to claim 11, further comprising a second liquid impermeable peripheral layer cooperative with the garment component to prevent liquid flow into and out of the space.

17. The garment according to claim 11, wherein the garment component further comprises a functional layer disposed in the space and optionally removably attached to the liquid impermeable base layer, the functional layer configured for facilitating collection of the bodily fluids in the space.

18. The garment according to claim 17, wherein the functional layer comprises at least one liquid absorbent element for absorbing the bodily fluids.

19. The garment according to claim 17, wherein the functional layer comprises at least one wicking element for wicking the bodily fluids away from the user.

20. The garment according to claim 11, wherein the garment component further comprises an attachment layer attached to the liquid impermeable base layer opposite to the space, the attachment layer for removably attaching the garment component to the garment.

* * * * *